US010679110B2

(12) United States Patent
Bar-On et al.

(10) Patent No.: US 10,679,110 B2
(45) Date of Patent: Jun. 9, 2020

(54) NANOTAGS FOR AUTHENTICATION

(71) Applicant: Ramot at Tel-Aviv University Ltd., Tel-Aviv (IL)

(72) Inventors: Ofer Bar-On, Tel-Aviv (IL); Yoav Blau, Tel-Aviv (IL); Jacob Scheuer, Tel-Aviv (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 0 days.

(21) Appl. No.: 16/371,243

(22) Filed: Apr. 1, 2019

(65) Prior Publication Data
US 2019/0303737 A1 Oct. 3, 2019

Related U.S. Application Data

(60) Provisional application No. 62/651,177, filed on Apr. 1, 2018, provisional application No. 62/683,046, filed on Jun. 11, 2018.

(51) Int. Cl.
*G06K 19/07* (2006.01)
*G06K 19/077* (2006.01)
(52) U.S. Cl.
CPC ... *G06K 19/0723* (2013.01); *G06K 19/07758* (2013.01)
(58) Field of Classification Search
None
See application file for complete search history.

(56) References Cited

U.S. PATENT DOCUMENTS

| 6,860,956 | B2 | 3/2005 | Bao et al. |
| 7,001,541 | B2 | 2/2006 | Dhar |
| 7,632,417 | B2 | 12/2009 | Suh et al. |
| 8,678,284 | B2 | 3/2014 | Scheuer |
| 9,104,948 | B2 | 8/2015 | Scheuer |
| 2002/0115002 | A1 | 8/2002 | Bailey et al. |
| 2004/0175631 | A1 | 9/2004 | Crocker et al. |
| 2004/0247874 | A1 | 12/2004 | Ryzi et al. |
| 2006/0196945 | A1 | 9/2006 | Mendels |
| 2007/0264481 | A1* | 11/2007 | DeSimone ........... A61K 9/5138 428/220 |
| 2007/0283883 | A1 | 12/2007 | Dakshina-Murthy et al. |

(Continued)

FOREIGN PATENT DOCUMENTS

WO  WO 2010/032243  3/2010

OTHER PUBLICATIONS

International Preliminary Report on Patentability dated Mar. 22, 2011 from the International Bureau of WIPO Re. Application No. PCT/IL2009/000906.

(Continued)

*Primary Examiner* — Kristy A Haupt

(57) ABSTRACT

A method for creating a nanostructure surface, comprises creating a nanostructure master having a surface being the negative of a shape that, when illuminated with a predefined illumination, provides a unique optical pattern; and creating nanostructure molds from the nanostructure master, wherein each nanostructure mold has a negative of the master surface which, when illuminated with the predefined illumination, provides the unique optical pattern, which may be a hologram. A nanotag may incorporate an image for identification and a unique pattern that can be identified for authentication.

14 Claims, 10 Drawing Sheets

(56) References Cited

U.S. PATENT DOCUMENTS

2011/0195141 A1    8/2011    Muhammad et al.
2012/0061471 A1    3/2012    Scheuer
2012/0282554 A1   11/2012   Kobrin et al.
2014/0175171 A1*  6/2014    Scheuer ........... G06K 19/06009
                                                         235/454

OTHER PUBLICATIONS

International Search Report and the Written Opinion dated Jan. 27, 2010 from the International Searching Authority Re. Application No. PCT/IL2009/000906.
Official Action dated Mar. 4, 2013 From the US Patent and Trademark Office Re. U.S. Appl. No. 13/320,930.
Official Action dated Oct. 23, 2014 From the US Patent and Trademark Office Re. U.S. Appl. No. 14/188,722.

* cited by examiner

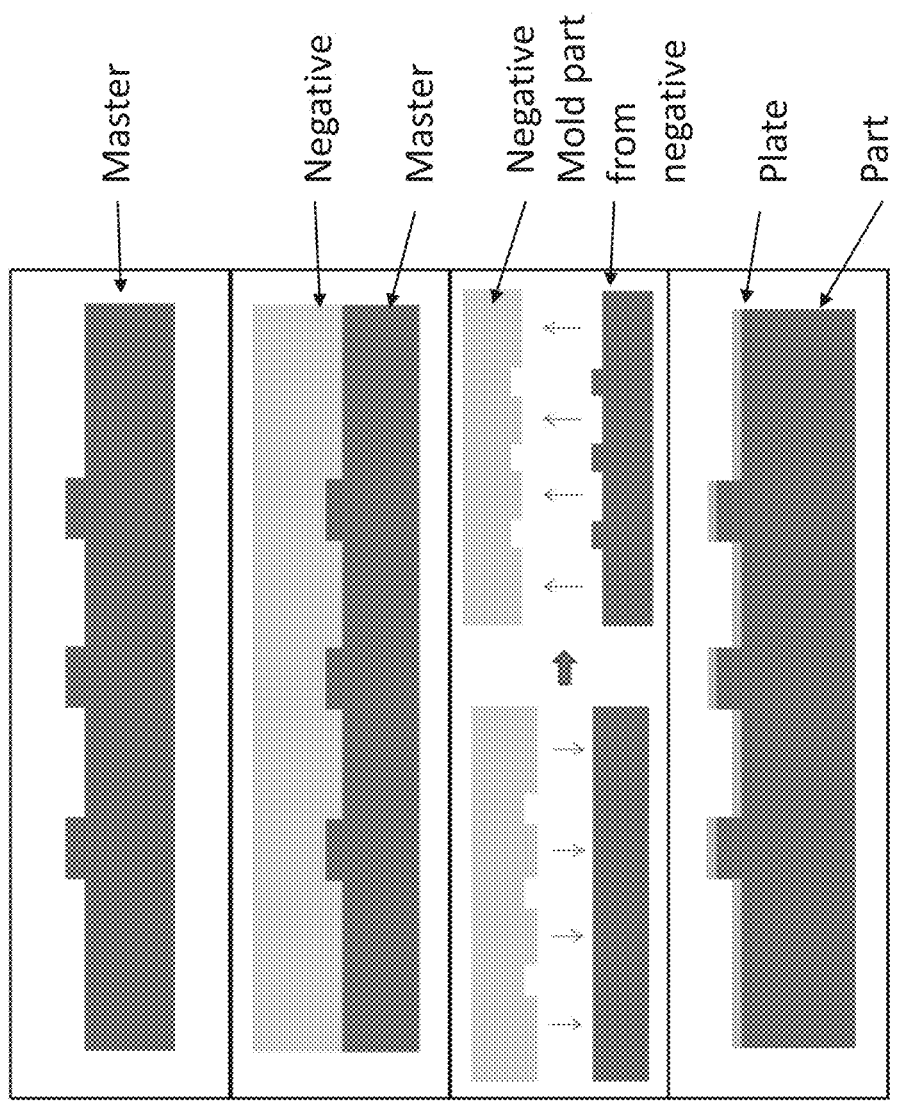

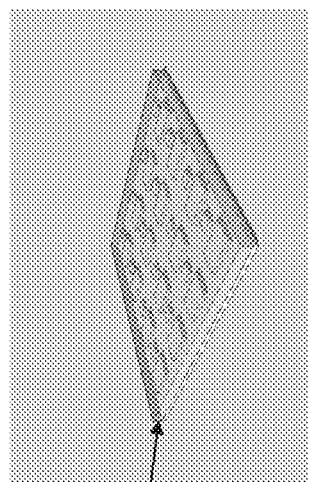
Fig. 2A — Master surface negative
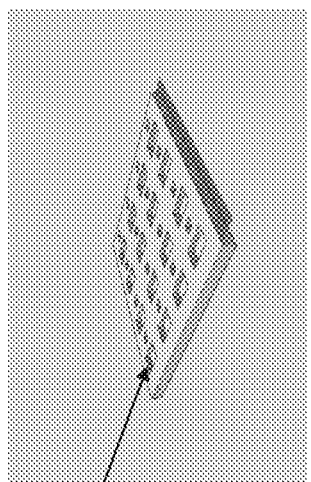
Fig. 2B — Mold of master-positive
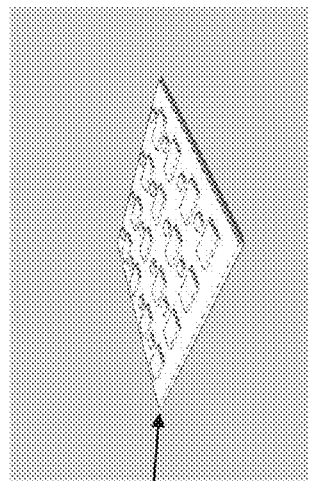
Fig. 2C — Mold surface cured
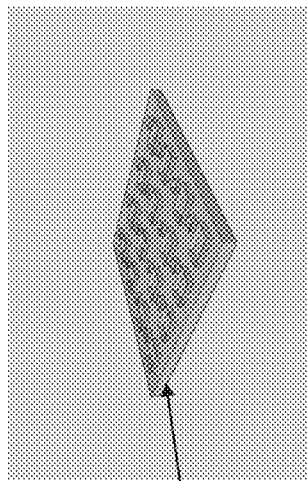
Fig. 2D — Mold surface coated with metal

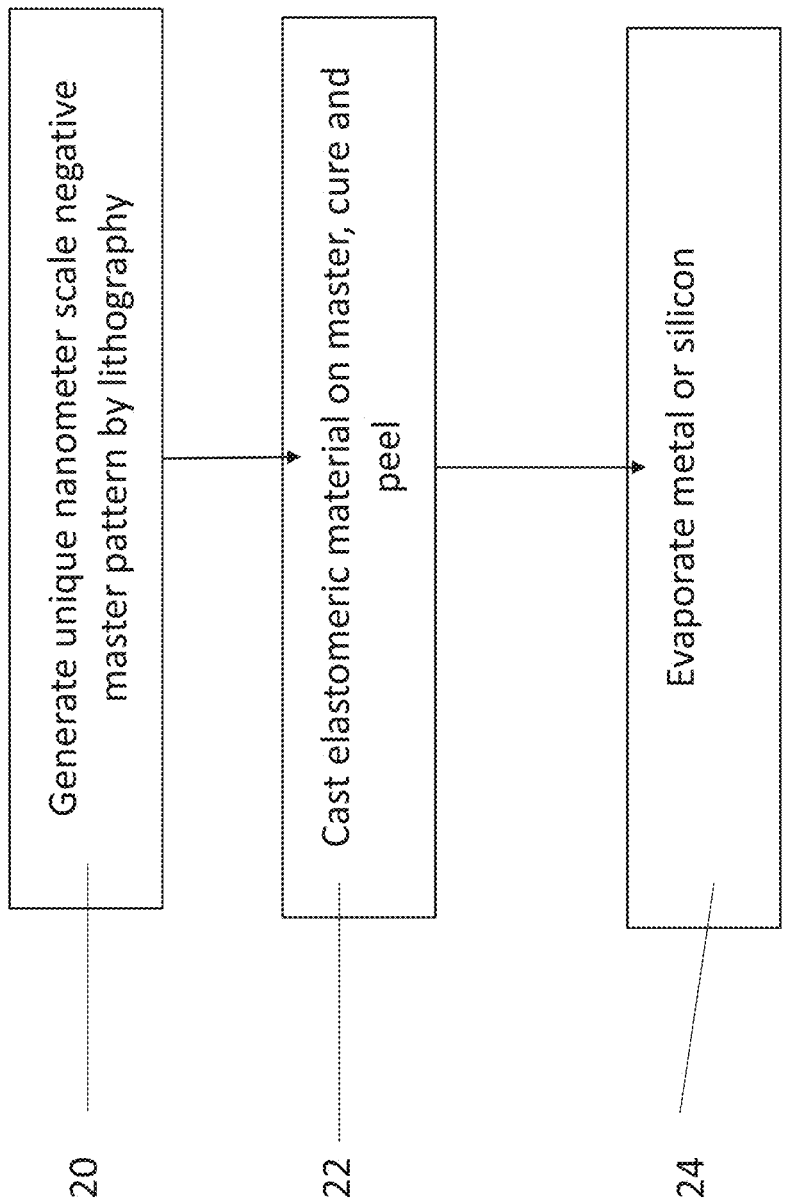

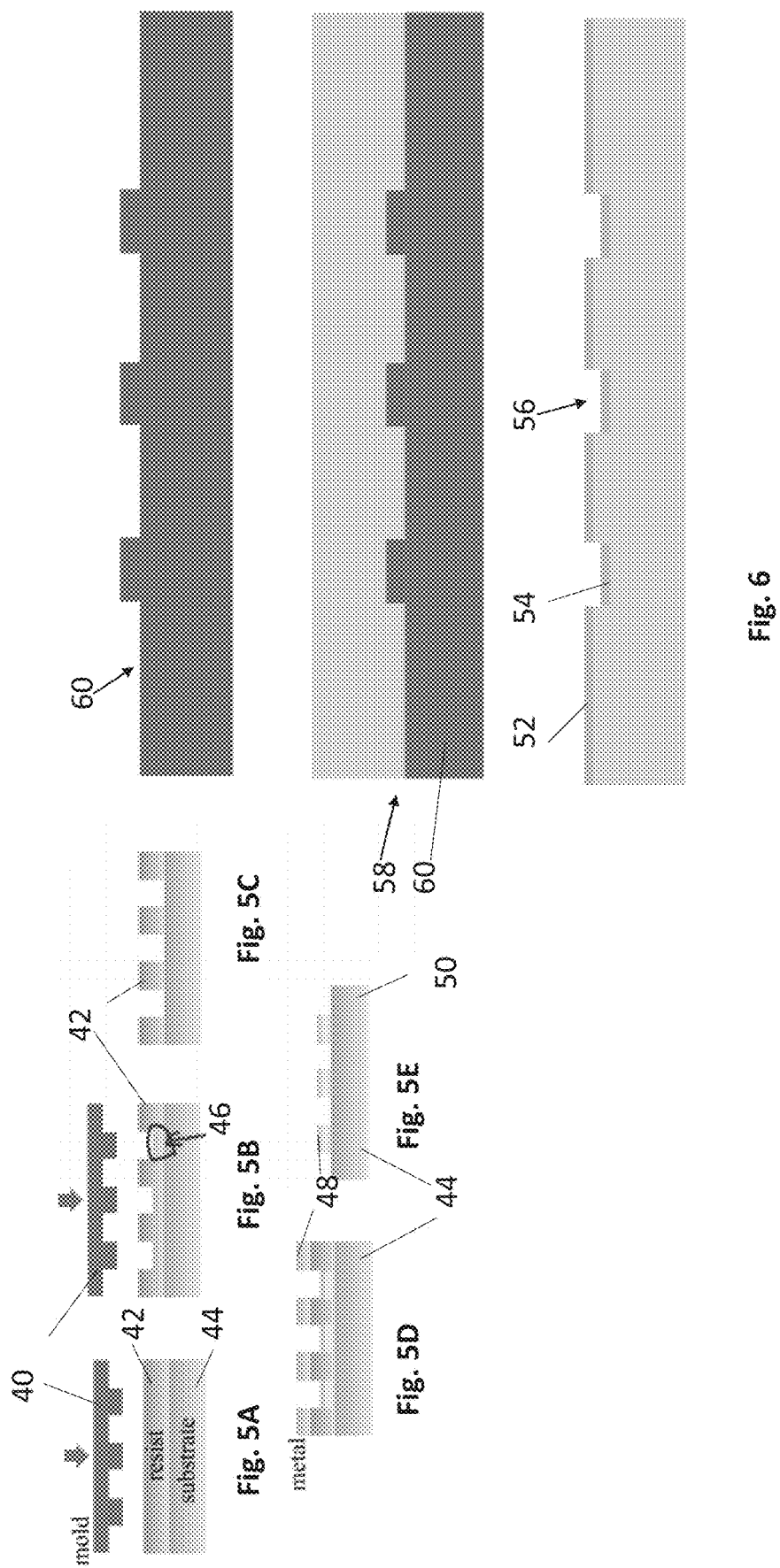

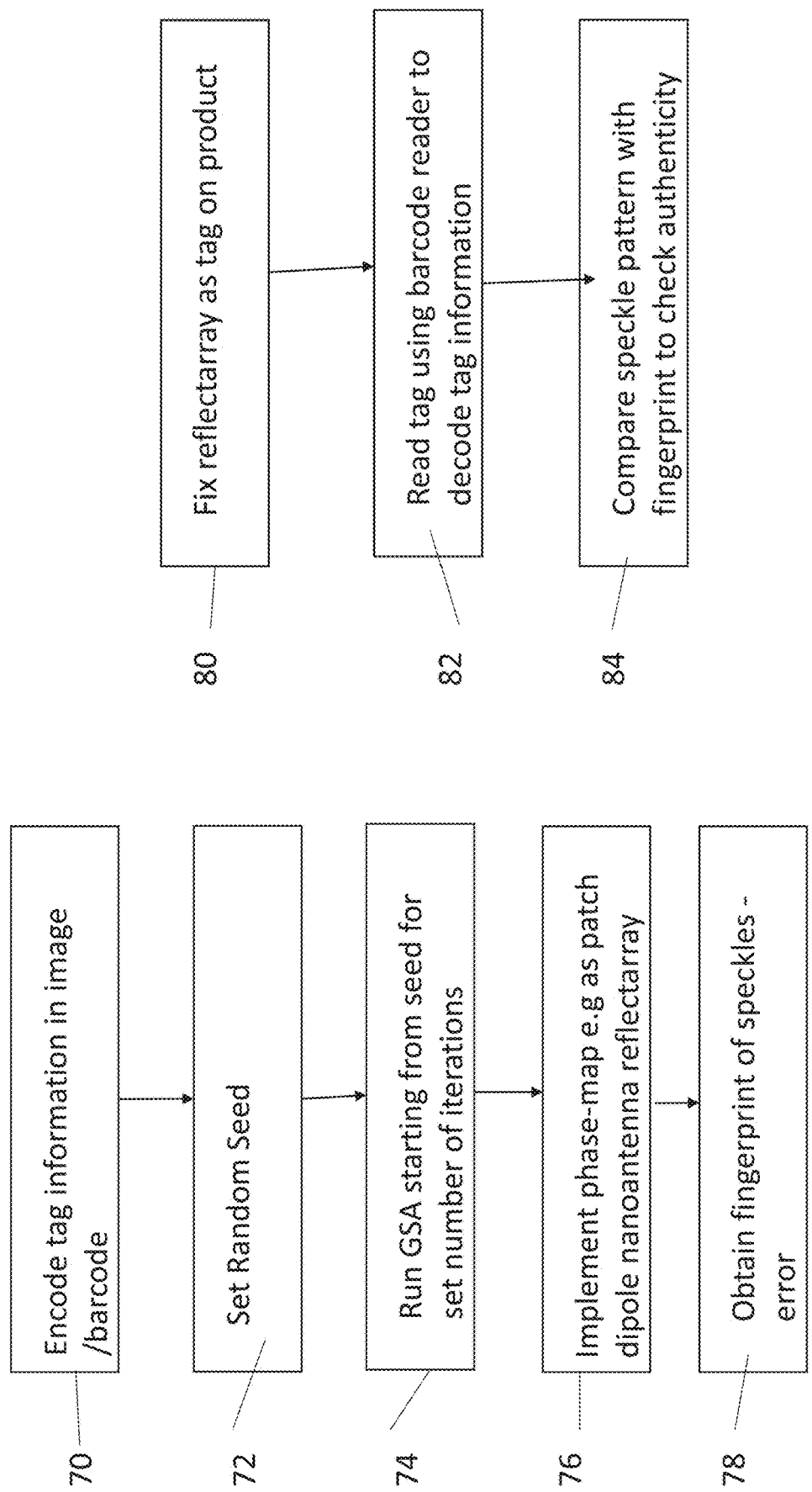

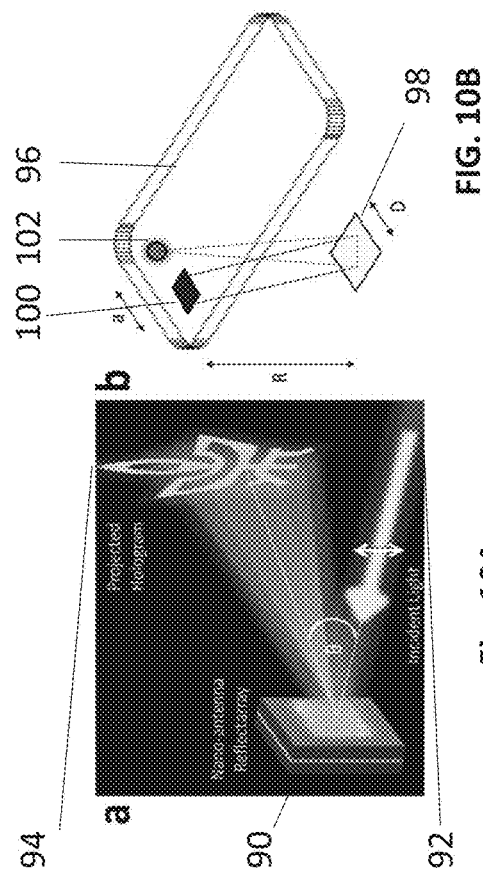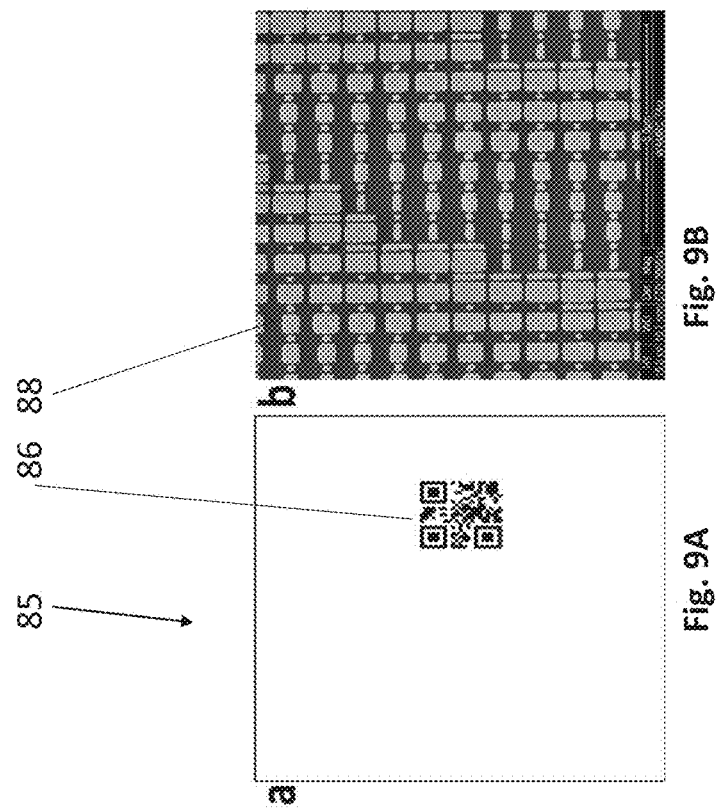

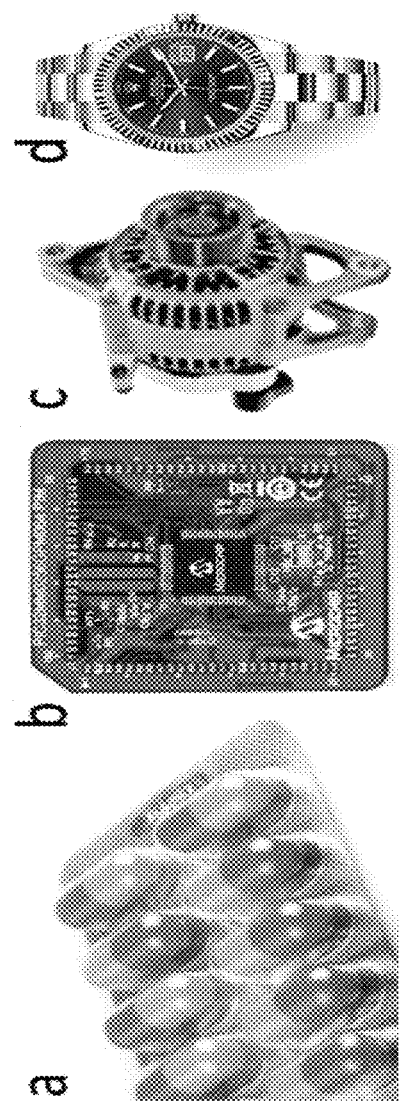

NANOTAGS FOR AUTHENTICATION

RELATED APPLICATIONS

This application claims the benefit of priority under 35 USC § 119(e) of U.S. Provisional Patent Application Nos. 62/651,177 filed on Apr. 1, 2018, and 62/683,046 filed on Jun. 11, 2018, the contents of which are incorporated herein by reference as if fully set forth herein in their entirety.

FIELD AND BACKGROUND OF THE INVENTION

The present invention, in some embodiments thereof, relates to nanotags for authentication and, more particularly, but not exclusively, to large scale production of such nanotags.

Product theft and counterfeiting are steadily growing around the world. As stated in the Netnames report, Counting the cost of counterfeiting, 2016, "In an environment where counterfeiting is as profitable as illegal drugs, but remains far less risky for criminals, we are seeing explosive growth. Expanding by over 15% every year, counterfeiting now costs more than 2% of total global economic output, or around $1.8 trillion per year"

In light of the scale of the problem, a simple, cost effective and hard to forge authentication tag is thus required. In recent decades, many solutions have been proposed to address the problem of product theft and counterfeiting. A tag which is easy to generate by the official distributor, easily read by the end user and hard to copy is a basic requirement.

As the race between manufacturers and forgers ever escalates, the ruling paradigm has traditionally been to periodically increase the level of complexity of authentication tags, in an effort to keep ahead of counterfeiters. State-of-the-art optical tags feature a primary layer of security, evident to forgers, and often replicable, and a secondary layer of security, typically involving complex interrogation methods, raising the bar for counterfeiters, and relying on trade secrets for their composition or fabrication methods. A simple, low-cost, authentication tag, easily interrogated for its encoded message, and also for its secondary security layer, is of great need and has yet to be demonstrated.

Current solutions ranging from complicated bio-markers to simple invisible inks have been suggested. Known solutions include a variety of techniques such as holograms, RFID, special inks, watermarks, and bio-markers. Some of these methods employ low resolution structures which can be relatively easily replicated and counterfeited. Others, based on special materials, require complex facilities for the authentication procedure. RFID chips, in particular, can be remotely interrogated without coming into contact with the product and the chip can be replicated. Their size inhibits their use for many applications. The most secure authentication approach employed today is based on bio-markers (e.g. DNA strands, etc.) which are almost impossible to counterfeit. However, the authentication process of these markers is complex and necessitates a forensic lab, thus rendering it impractical for many applications, especially where hand-held interrogation is required. Other optical anti-counterfeit tags can be roughly divided into the following categories: taggants forming special images, with distinct appearances under different illumination conditions; barcode taggants primarily displaying encoded information, and supporting a secondary security layer; and intrinsically random patterns, such as dropcast nanomaterials, which are unique and unclonable. The latter offers the simplest fabrication and a very high level of security, being a high resolution large area distribution. However, it involves a comprehensive interrogation, compiling a database per tag, which is then passed on as a secret to all other interrogating entities.

Thus there is an inherent tradeoff between the tag security level and its ease of fabrication. While bio-markers offer an extremely high security solution, they are very hard to generate and be verified by the end user. A relatively good compromise between easy handling and difficulty to forge can be achieved using holograms generated using metallic nano-structures. Such tags are based on metallic nano-elements, which generate a desired hologram when illuminated. They are easy to read but hard to copy.

Such a nano-tag may provide an authentication tag to prevent counterfeiting. Almost every brand in the world is subject to replication and theft. An inexpensive tag which may ensure the authenticity of the brand may be a very desirable product.

The technology is based on the following scheme. An array of nano metallic structures is illuminated with a light beam and results in a reflected hologram. If the reflected hologram matches the expected pattern, then it may be inferred that the specific product is authentic. The detection scheme is based on the phase difference generated by each element of the metallic nano-structures. The complete phase imposed on the impinging beam result in the reflected hologram. The metallic elements in the array are of nanometer scale what makes them hard to forge.

When illuminated, the nano-structures reflect a unique pattern which can be verified using a simple detector. While the detection scheme is straightforward, the fabrication of these structures can be complicated due to their nanometer scale. The most common way for generating nanostructures is by using electron beam lithography (EBL). Although EBL is very accurate, it is a serial fabrication process, meaning each element has to be written separately, as opposed to parallel techniques which can generate the whole pattern in one step, hence, relatively slow and expensive rendering it less compatible for commercialization.

In order to overcome these drawbacks, a parallel method for generating nano structures designated as nano imprint lithography (NIL) designated sometimes as soft lithography when using a soft material for the mold, has been demonstrated.

The NIL technique is illustrated in FIG. 1A-FIG. 1D and may comprise four steps for generating metal structures:

A) Fabrication of a master template (Using EBL for example).

B) Generation of a negative instance—mold—of the master by molding a suitable material onto the master.

C) Generation of a positive replica of the master by imprinting the mold onto a suitable material.

D) Deposition of metal on top of the replicated pattern to achieve metallic nano structures.

Thus, although the master is expensive and complicate to generate, it is now much faster and simpler to generate multiple replicas thereof. Note that step C in the process requires delicate alignment between the mold and the target substrate (especially when using hard molds) and equal force distribution which usually requires large and expensive machinery, particularly for mass production.

NIL thus has the disadvantage of requiring large and expensive machine, particularly for mass production.

Additional background art includes US 2014/0175171, System and Method for nano-imprinting Feb. 25, 2014, U.S. Pat. Nos. 8,678,284 and 9,104,948.

SUMMARY OF THE INVENTION

The present embodiments may provide an authentication process for a nanotag, and a nanotag made to the process, in which a pseudo-random physical process (PR-PUF) is applied to nanotag manufacture in order to provide security against attempts at piracy. The pseudo-random physical process may provide a way for manufacturing the nanotag which is easy to carry out but difficult for anyone other than the manufacturer to carry out. The pseudo-random process may further provide a method for readout in a way that allows for simple and easy verification but without requiring the release of information that would help a potential forger.

In embodiments, the process of manufacturing the nanotag is improved by leaving out the intermediate stage of producing the negative mold, thus saving on time, and complexity. Thus the NIL machine is not needed. The master is itself a negative and thus the imprint is a positive which can be coated and used directly as the product.

In the present embodiments, the metal is evaporated on top of the immediate mold to form the end product, thus allowing an intermediate stage to be avoided. The improvement not only spares one stage but also addresses certain technological issues. First, the replication step requires large expensive machinery which also sets a limit on the size of each fabricated tag, or group of tags fabricated together and separated. In addition, the replication stage requires alignment procedures which become more difficult the larger the scale.

These issues may be solved using the present method, thus improving speed, cost and simplicity. The hologram is passed on directly from the master and can be read using illumination while the master pattern can be used again for generating another hologram.

Further embodiments relate to a holographic tag made using the above techniques. In one case, a speckle pattern is produced on the holographic tag which is based on an initial number and a secret seed to a pseudorandom process.

According to an aspect of the present invention there may be provided a method for creating a nanostructure surface, the method comprising:

creating a nanostructure master, wherein the nanostructure master comprises a first surface being the negative of a shape that, when illuminated with a predefined illumination, provides a predetermined unique optical pattern; and creating a plurality of nanostructure molds from the same nanostructure master, wherein each nanostructure mold provides a second surface which, when illuminated with the predefined illumination, provides the predetermined unique optical pattern.

The method may comprise forming the mold by placing a soluble material, for example a polymer, on the first surface, and curing the polymer. The method may further comprise peeling the cured polymer from the first surface to expose the second surface, and/or coating the exposed second surface with a metal or with a dielectric material, for example silicon.

Coating may comprise evaporating, sputtering or spin-coating, and the metal may be gold aluminum, silver or titanium.

The polymer may comprise Polydimethylsiloxane.

The unique optical pattern may be determined when making the nanotag and may be a hologram.

The molds may be directly formed into tags, including nanotags.

The tags may be made into stickers for application to products.

The method may comprise applying the tags to products in a production line.

The method may comprise illuminating the tag to receive an optical pattern, and determining authenticity of the tag in response based on a comparison between the received optical pattern and the unique optical pattern.

The embodiments extend to the product or article carrying the tag.

According to a second aspect of the present embodiments there is provided a nanotag comprising a dual layer metallic surface having an inner layer part and an outer layer part, the outer layer part of the dual layer metallic surface comprising nanostructures which, when illuminated with a predefined illumination, provide a predetermined unique optical pattern.

In an embodiment, the outer part of the nanostructure dual layers is on a raised surface of resist and the inner part of the nanostructure dual layers is on an inclusion in the resist.

The resist shows a surface consistency indicating casting or molding.

According to a third aspect of the present embodiments there is provided a nanotag comprising a metallic outer surface layer, the metallic outer surface layer comprising nanostructures which, when illuminated with a predefined illumination, provide a predetermined unique optical pattern, at least some of the nanostructure metallic layer being on a surface of resist, wherein the resist shows a surface consistency indicating casting or molding.

According to a fourth aspect of the present invention there is provided a method of providing a secure nanotag for identification and authentication, the method comprising:

obtaining an image for identification;

providing a seed;

using the seed to seed a process for generating a phasemap that reproduces said image as a hologram;

terminating the process after a specified number of iterations;

using the phasemap to manufacture a nanotag surface to produce said hologram;

thresholding the hologram to provide a predetermined number of brightest pixels; and providing a fingerprint for said nanotag that identifies a pattern produced by said brightest pixels, the fingerprint being for authentication.

In an embodiment, said image is a barcode comprising a message;

In an embodiment, said nanotag surface is contoured as a patch dipole nanoantenna reflectarray.

In an embodiment, said nanotag surface is manufactured using one of the methods discussed hereinabove.

In order to secure a product, the method may involve affixing said nanotag to a product or packaging and separately distributing said fingerprint.

The method may comprise manufacturing the nanotag surface to produce a hologram at a predetermined distance.

The method may comprise interrogating said nanotag by applying a laser beam to said nanotag and photographing said hologram.

In an embodiment, said image is a 2D barcode, the method comprising reading said barcode from said photograph.

In an embodiment, said fingerprint comprises a sequence of coordinates of said brightest pixels, and the method comprising thresholding said photograph to find said predetermined number of brightest pixels and comparing said pixels to said coordinates.

According to a fifth aspect of the present invention there is provided a nanotag comprising:

a surface comprising an implementation of a phase map to project an image as a hologram;

the surface further comprising a speckle pattern of brightest pixels, the speckle pattern being unique to a seed number used to generate said phase map.

In an embodiment the surface comprises a patch dipole nanoantenna reflectarray.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 1A-1D illustrate the prior art NIL fabrication method for manufacturing authentication nano tags using soft lithography, and shows A) fabrication of the master device, B) generation of a mold by casting an elastomer on the master device, C) using the mold to imprint a pattern inside a new material, and D) evaporation of metal on top of the new substrate, defining different metallic elements;

FIGS. 2A-2E are four simplified diagrams and a flow chart showing a fabrication method for authentication of nano tags according to the present embodiments, A) fabrication of a master device using conventional lithography, B) casting a polymer onto the master and curing it, C) the polymer mold is released from the master. D) Evaporation of metal on the top surface, and E) a schematic flow chart of the process as a whole;

FIGS. 5A-5E show a molding process to produce a nanotag using imprinting;

FIG. 6 shows a nanotag according to the present embodiments made by casting or molding;

FIG. 7 is a simplified flow chart illustrating a method for applying a hologram to a nanotag embodiments of the present invention;

FIG. 8 is a simplified flow chart showing a procedure for interrogating the nanotag of FIG. 8;

FIG. 9A shows a design image with an embedded 2D barcode, in this case a QR code used with the GSA algorithm;

FIG. 9B shows a SEM micrograph of a fabricated hologram based on the image of FIG. 9A, implemented as a patch-dipole nanoantenna reflectarray;

Figure 11:
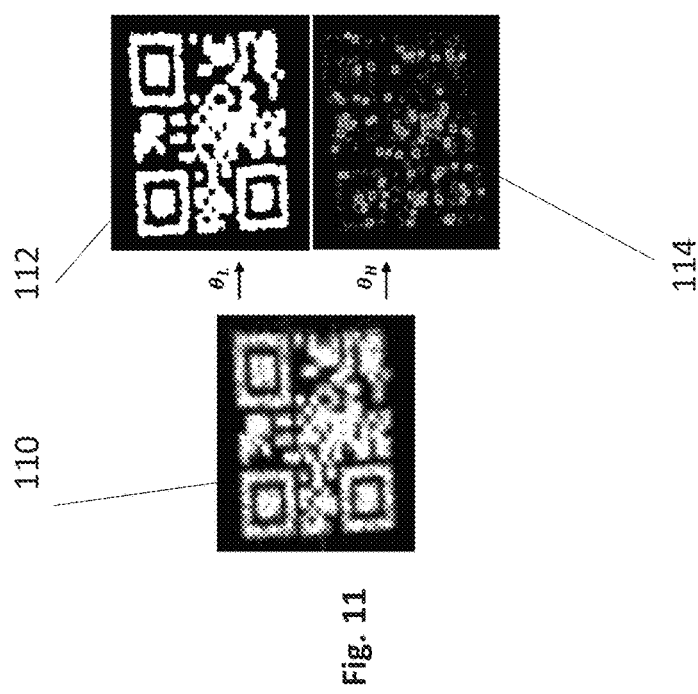

FIGS. 10A and 10B schematically illustrate illumination of the nanoantenna reflectarray to produce a projected hologram for interrogation and a mobile device for carrying out the interrogation;

FIG. 11 is a simplified diagram showing the hologram image, low level thresholding to read the image itself and high level thresholding to produce the speckle pattern according to embodiments of the present invention;

FIG. 12A shows a simulation of a speckle pattern according to embodiments of the present invention;

FIG. 12B shows an experimental image of a speckle pattern obtained using an implementation of the present invention;

FIG. 12C shows circles generated from the fingerprint of the present embodiments to indicate where the speckles are to be found;

FIG. 12D shows a mismatch between a fingerprint and between spots from a non-authentic tag, wherein spots mark the speckle maxima and circles that mark the experimentally measured maxima used for the fingerprint, but the counterfeit label produces dots that only match 65% of the circles;

FIG. 12E indicates counterfeit tag match distribution following the stagnation of the phase retrieval algorithm ($\mu$=67.3%, $\sigma$=2.7%, N=600);

FIG. 13A shows Blister packaging of pharmaceutical pills in which an identifying number is imprinted near the edge, on a smooth metallic surface, and to which a tag according to the present embodiments may be affixed;

FIG. 13B shows a microchip to which tags according to the present embodiments may be imprinted on the PCB borders used for handling;

FIG. 13C shows auto parts that may include optical security tags where QR codes are printed; and FIG. 13D shows luxury watches which may incorporate discrete security tags on their faces or their backs.

DESCRIPTION OF SPECIFIC EMBODIMENTS OF THE INVENTION

The present invention, in some embodiments thereof, relates to nanotags for authentication and, more particularly, but not exclusively, to large scale production of such nanotags as well as a nanotag that provides anti-counterfeiting protection and a further nanotag designed to have two levels of anti-counterfeiting protection.

Product theft and counterfeiting are steadily growing around the world, and a simple, cost effective and hard to forge authentication tag is thus required. Tags based on metallic nano-elements which generate a desired hologram once illuminated are a good candidate for the task since they are easy to read but hard to copy.

The present embodiments may provide a method for large scale production of these authentication nanotags. Such a large-scale fabrication process may overcome many drawbacks of currently employed production methods for these types of geometries. The tags generated using the present embodiments may be uniquely identified and may be extremely complicated to forge.

A nanotag according to embodiments of the present invention may incorporate a hologram image for identification. A further nanotag according to embodiments of the present invention may add to the image a unique pattern that is hard to reproduce but easy to verify for authentication purposes. The image may for example be a message about a product, the message being encoded as a two-dimensional (2D) barcode and turned into a hologram, and the pattern may be obtained by thresholding the hologram to find a preset number of brightest pixels. The hologram may be obtained using an iterative algorithm based on a random seed. Using the algorithm, the image may be stable under the algorithm but the pattern may be sensitive to the seed and the number of iterations. A forger wishing to achieve accurate recreation of the pattern requires either knowledge of the seed and the number of iterations or has to find another way to generate the nanotag surface that exactly produces the pattern found in the resulting hologram.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present embodiments may provide a method for mass production of authentication tags based on nanometer scale elements. These tags are composed of nanometer metallic structures, for example patch dipole nanoantenna reflectarrays, and the images may be identified by shining light on the arrays and reading the unique hologram which is reflected from them. The present fabrication method may overcome certain difficulties that exist in standard fabrication methods for these types of devices as will be discussed hereinbelow.

The present embodiments comprise a replication method which includes three main stages.

i) The generation of a unique nanometer scale pattern using a conventional lithography technique (See FIG. 2A). This is the most expensive and time consuming part of the process but should be carried out only once.

ii) Casting an elastomeric material on top of the original pattern (See FIG. 2B), curing it and peeling it to serve as the basis for the hologram (See FIG. 2C).

iii) Evaporation of metal, for example gold, aluminium, silver or titanium, on the elastomeric replica completing the replication step (See FIG. 2D). As an alternative to metal, a dielectric material such as silicon may be used. As alternatives to evaporation, sputtering or spin coating may be used.

Referring now to FIG. 2E, box 20 indicates generation of a unique nanometer scale negative master pattern by lithography. FIG. 7 discussed hereinbelow provides an example of how such a unique pattern may be obtained.

Box 22 indicates how elastomeric material may be cast directly onto the master to provide a positive cast. Gravity may be used and there is no need for high pressure to obtain a faithful cast. The elastomeric material is then cured and peeled.

In box 24, metal or silicon is evaporated onto the cast.

Note that in the embodiment of FIGS. 2A-2E we get the inverse pattern of the original pattern but this can be resolved by designing the master accordingly, so that the master is in fact a negative of the desired pattern. The master pattern can now be used again for generating another hologram. Using this method we can easily produce large numbers of tags in a short time with relatively inexpensive machinery. Using this method, there is no need to deal with the alignment problem of the prior art since the step of producing a negative is no longer required. Scalability of the process is improved since no limit is imposed by the size of an arm which aligns the mold to the substrate (FIG. 1C). Rather, the limiting factor is only the substrate size, which can be significantly larger.

More particularly, in the prior art system of FIGS. 1A-D, the negative is a mold for the final product, whereas in the present embodiments the master is itself the negative, from which the product itself may be made. Thus the present embodiments may use a material that uses gravity and/or surface tension to mold itself into the final shape on the master, whereas the prior art requires a sturdier material that requires imprinting under pressure.

A difference between imprinting, and the process of the present embodiments, which uses molding/casting, is related to the pressure applied in the process. In imprinting, equal force distribution is usually applied on the mold, requiring good alignment between the mold and substrate, while in the present embodiments the force and alignment is done naturally by gravity. A common reason for using imprinting is that not all materials can be cast into a mold, some materials need to be imprinted in order to take on a precise shape, especially when nanostructure is involved.

Figure 3B:
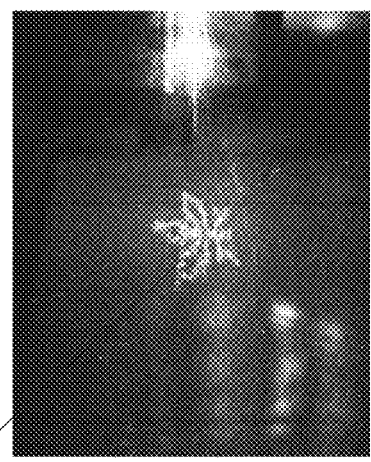
FIGS. 3A and 3B are two simplified images showing A) the surface schematically producing a hologram and B) images of the reflected pattern from a tab replicated according to the present embodiments.
Figure 3A:
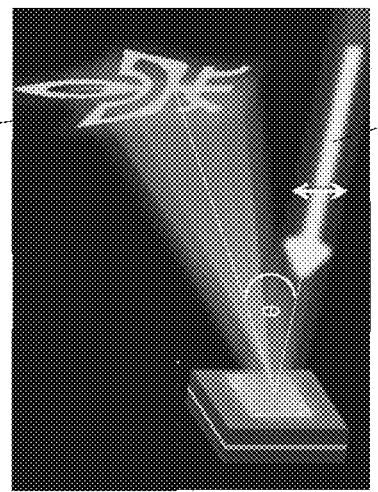

FIG. 3A demonstrates the reading scheme of the replicated tags. A laser beam 25 illuminates the tag 26 producing the designed reflected hologram 27, which can then be read using a simple detector. FIG. 3B shows a photo of a pattern 28 generated from a replicated nano metallic tag. The tag demonstrated in FIG. 3B was made using Polydimethylsiloxane—PDMS polymer as substrate and gold as the metallic structures. Alternatively, different polymers/sol-gels can be used to form the substrate, depending on the application.

The hologram is now ready and can be read using illumination 25 as shown in FIG. 3A. The replication method may show a clear pattern 28 as seen in FIG. 3B.

The master pattern can now be used again for generating another hologram. Using the present method it may be possible to produce large numbers of tags in a short time with relatively inexpensive machinery.

The resulting tags may be used to help prevent product counterfeiting. The nano tag may be attached to any product or surface, and may be incorporated into a production line or can be applied as a standalone sticker. The tag may then enable unique identification. The output hologram may be selected by the user, and may be a company product logo, a desired image or the like. For a second layer of security the embodiment discussed in respect of FIGS. 7 to 15D below may be used.

The product may be used both by the client's employees/affiliates and their end consumers, who may use a light source to illuminate the tag, which may then generate the desired hologram design and verify the product's authenticity.

Figure 4:
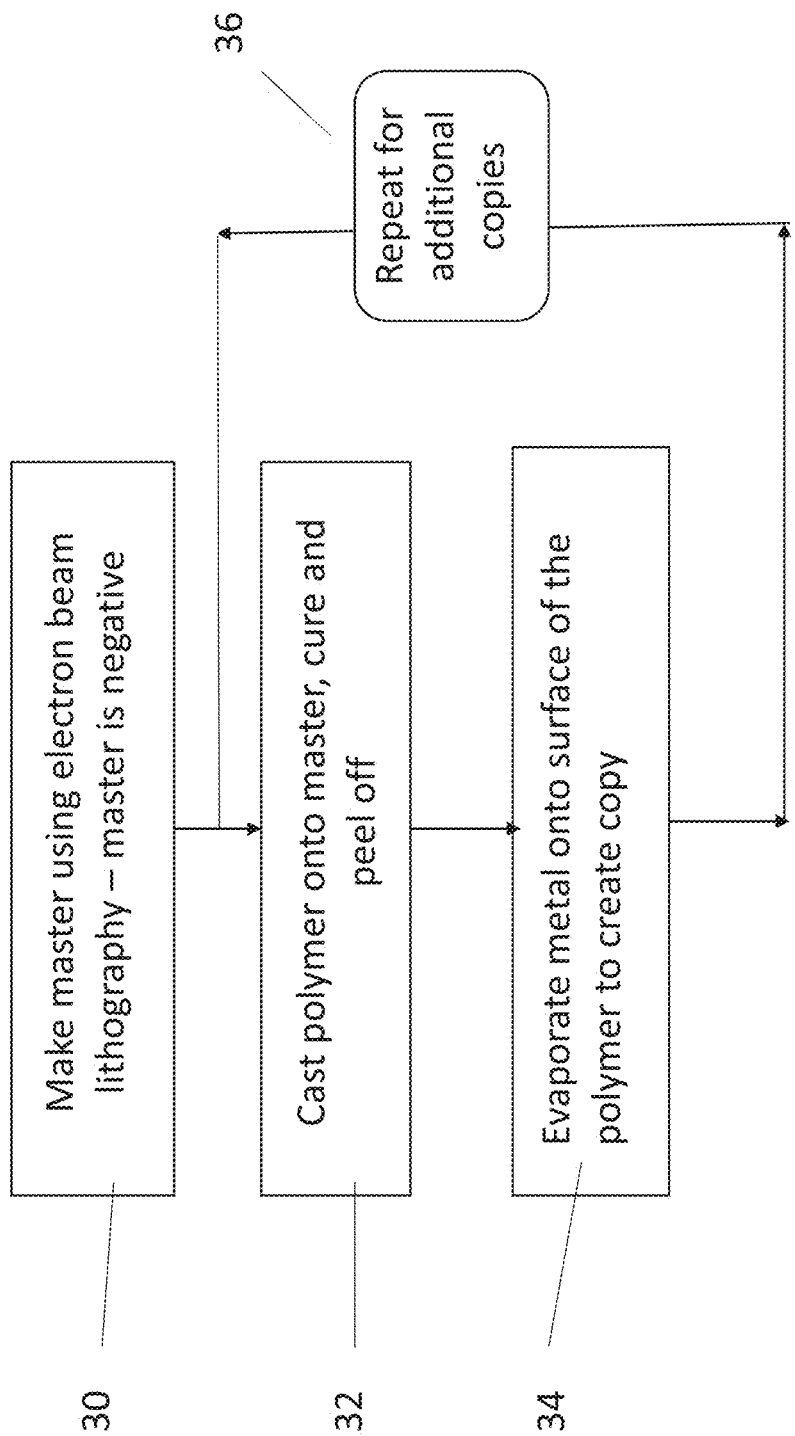
FIG. 4 is a simplified flow chart illustrating in greater detail an implementation of the manufacturing process of FIG. 2E according to the present embodiments.

FIG. 4 is a simplified flow chart showing a more detailed implementation of the process of FIG. 2E, in which a negative master is created in box 30 using electron beam lithography. As discussed, the master is a negative. In box 32, polymer, for example Polydimethylsiloxane—PDMS polymer, is used to make a cast of the master, and the cast is cured and peeled off the master. In box 34, the cast may then be coated with silicon, or with metal, in particular with gold, to generate the tag with the hologram. As shown in box 36, further copies may be made using the same master. As discussed above, what is shown in FIG. 4 is a process in which the metal is evaporated onto the top of the mold instead of onto a replica of the mold, thus allowing an intermediate stage to be avoided. The improvement not only spares this intermediate stage but also addresses certain technological issues. First, the replication step requires large expensive machinery which also sets a limit on the size of each fabricated tag or group of tags fabricated together to be separated. In addition, the replication stage requires alignment procedures which are more difficult the larger the scale.

The above issues may thus be solved using the present method, thus improving speed, cost and simplicity. The hologram is finished directly from the master and can be read using illumination while the master pattern can be used again for generating another hologram.

Reference is now made to FIGS. 5A-E and FIG. 6, which relate to the construction of the nanotag. FIGS. 5A-5E show how a nanotag may be made by imprinting from a mold 40—that is the process as in FIGS. 2A-E. In this process, imprinting is made into a film of resist 42, resting on a substrate 44. The resist 42 may be very thin to begin with. The resist is applied to the mold, and underneath the protrusions of the mold only a very thin residual layer 46 in FIG. 5B is left, and sometimes no residual layer is left at all. The residual layer may be etched using plasma treatment, as shown in FIG. 5C. Metal 48 is then evaporated onto the resist 42, or directly onto the substrate 44 if the resist has been removed entirely, as shown in FIG. 5D. Finally, a Lift-off process is performed, meaning, a chemical process is used which removes the resist along with the top metal layer, to leave the final nanotag 50 as shown in FIG. 5E.

As discussed, the present embodiments use casting and molding instead of imprinting, as the product is cast or molded directly from the negative master. Hence it is harder to control the residual layer thickness, resulting in a microscopic layer structure of the resist layer which is different. Thus the product 50 as shown in FIG. 5E is noticeably different under microscopic examination of the layers. The lack of definition of the resist layer in fact suggests that the removal of the protrusions need not be performed and both the raised and recessed surface portions may be used together to make a unique nanotag. Referring now to FIG. 6, the stage of removing the top metal layer and the resist need not be carried out. Rather both raised 52 and lowered 54 metal layers are left to form a dual layer nanotag 56. Both the raised and lowered metal layers are used to form the nanostructures following molding 58 with the negative master 60.

Thus the process of the present embodiments provides a way to produce a dual layer nanostructure product solely from molding and without using imprinting. This is useful as imprinting complicates the process, as discussed.

Materials currently used in the process include commercial polydimethylsiloxane (PDMS) and/or commercial sol-gel.

Reference is now made to FIG. 7, which is a simplified flow chart illustrating a method of making a nanotag according to the present embodiments which has a second layer of security. The tag of the present embodiment may both contain information about the product or the like or other identification information or simply a hologram image, and as a second layer contains authenticity information which is made to be hard even to find and even harder to forge. There may thus be provided a holographic tag that can be used as a security tag, particularly useful for anti-counterfeiting, offering a simple-to-use but hard to misuse authentication mechanism. Many tags may be mass-manufactured as explained above, and easily interrogated for their identifying fingerprint down the supply chain as will be explained hereinbelow. In various exemplary embodiments of the invention the tags cannot be forged by any feasible means.

In FIG. 7, box 70 shows a message carrying information to be carried on the tag, for example a product/batch identifier, a timestamp, or an expiration date, and the information is encoded in a 2D barcode, such as a QR code 86 in FIG. 9a. As indicated in box 72, the design of the tag involves a random choice of a seed number, which is considered a secret and which is used to initiate a pseudo-random sequence.

The Gerchberg-Saxton algorithm (GSA) is an algorithm that finds the phase of a pair of light distributions. Applied to the tag of the present embodiments, GSA is used to determine the hologram that, when illuminated by a Gaussian light beam, projects an approximate image similar to an arbitrary design image, as indicated in box 74 and see FIG. 10A. GSA is initialized with the seed, and the barcode image is embedded into a design image. After a number of iterations, for example approximately 2000, the algorithm becomes stationary at an approximate solution, a phase-map, and an error remains, i.e. a difference remains between the design image and the approximate image.

The phase-map can be optionally and preferably implemented by an array of nanoantennas, as indicated in box 76 and shown schematically in FIG. 9B as an implementation by a patch-dipole nanoantenna reflectarray. The error manifests as speckles left on the approximate image, and their intensities and positions completely change from iteration to iteration, and per the random seed. The image is then analyzed in box 78 to extract a fingerprint, namely the output of a simple function identifying the unique speckle distribution. One such function is simply implemented by recording the spatial coordinates of the k brightest spots in the image. Using this function, the fingerprint is a set of k coordinates. Other functions may serve just as well. The fingerprint is recorded and may be distributed or broadcast to facilitate authentication in other points along the chain of supply and distribution. The seed number may be immediately discarded to prevent it from falling into the hands of counterfeiters.

Thus, while the GSA algorithm could be quite easily implemented to obtain a reasonably stationary result to give the nanotag image, the speckles vary drastically between iterations. A forger not knowing either the seed or the number of iterations would have to measure the actual positions of the speckles floating in a hologram and then somehow build a nanotag that leads to the same speckle pattern in the hologram when illuminated.

FIG. 9A shows a design image 85 with an embedded 2D barcode 86, in this case a QR code used with the GSA, and FIG. 9B shows a SEM micrograph 88 of the fabricated hologram implemented as a patch-dipole nanoantenna reflectarray. The reflectarray may conveniently be built into the nanotag surface using any suitable method for making a nano-scale hologram surface, and in particular the methods described above with respect to any of FIGS. 1 to 6.

Referring now to FIG. 8 and the reflectarray is fixed as a tag on a product, part or packaging or even a document that needs authenticating—box 80. In box 82 the tag is read using a barcode reader, and the reader is able to read the barcode. In box 84 the speckle pattern is obtained and compared with the fingerprint.

FIG. 10A is an illustration of the illumination of a holographic plate 90 using a beam 92 to project an image 94 of a logo. FIG. 10B is a schematic of an interrogation device which may be implemented on a mobile phone 96. The device is hand-held, at a distance R from the tag 98. The tag 98 has a side length D and a laser 100 source is at a distance a from camera 102. The laser 100 illuminates the tag 98 and the 2D barcode is captured by the camera 102.

Thus, interrogation of the tag is optionally and preferably carried out by a simple terminal including properly positioned laser source 100 and camera 102 as shown in FIG. 10B. The laser illuminates the tag 98 from a specified distance R and the camera captures the image projected by the holographic tag. Applying a low threshold $\theta_L$ to the image, the barcode can be decoded for its message. A higher threshold $\theta_H$ can be applied to the same image to extract the fingerprint, and verify its authenticity. The thresholding is illustrated in FIG. 11. As shown in FIG. 11, the image 110 projected from the tag is thresholded by a low threshold $\theta_L$ to produce a QR code 112 as a black and white inverted image, and then the images is thresholded with a high threshold $\theta_H$ to produce a fingerprint 114 which consists of speckles apparently randomly placed around the image. As discussed the image 112 changes little and can be reliably decoded to obtain the original barcode and retrieve the information. However the pattern in the speckle image 114 changes drastically depending on the seed and the exact number of iterations.

Figure 12:
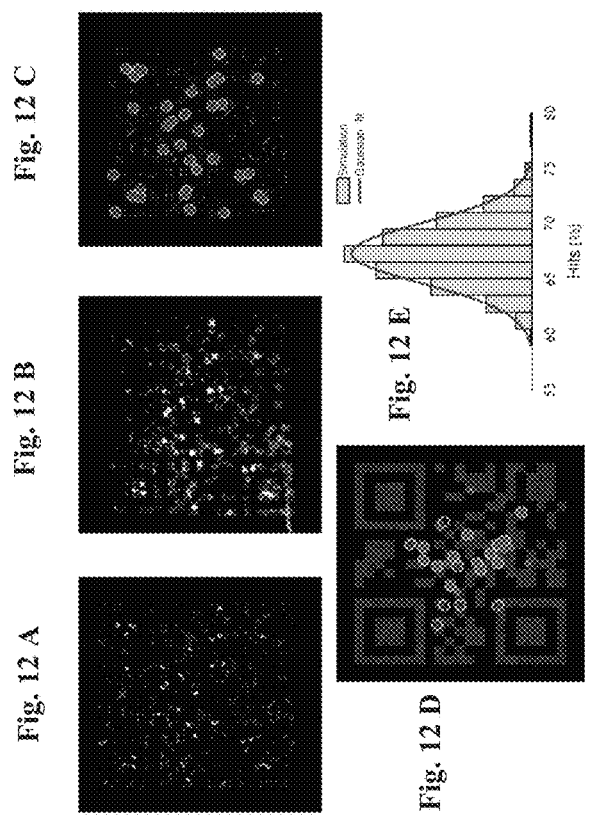

FIGS. 12A to 12C demonstrate how a simulated speckle pattern correlates very well to a speckle pattern recorded in an experimental optical setup. The result is repeatable across different devices as long as they are generated from the same seed, and is found to be robust against fabrication defects. FIG. 12 (a) shows a simulation and FIG. 12(b) shows an experimental image. FIG. 12 (c) shows a speckle corresponding to the designed fingerprint and in FIG. 12(d) spots mark the simulated speckle maxima and circles mark the experimentally measured maxima. The 20 brightest spots in the original design form the fingerprint and are marked in circles, and a counterfeit label fingerprint produces the dots, matching 65% of the points. FIG. 12(e) indicates counterfeit tag match distribution following the stagnation of the phase retrieval algorithm ($\mu$=67.3%, $\sigma$=2.7%, N=600).

FIGS. 12D and 12E thus demonstrate numerically that a counterfeiter, having an ideal image of the field projected by an original tag, cannot design a counterfeit tag that shows the same speckle pattern, while maintaining the other constraints of the design (the 2D barcode, and the distance from tag to camera). The inventors show quantitatively that, using the fingerprint herein, only about 67% of measured fingerprint coordinates match the original on average, with a standard deviation of 2.7%. Therefore, it is shown that the counterfeiter cannot feasibly solve the phase retrieval problem to a satisfactory degree.

The tag of the present embodiments is relatively easy to interrogate as compared to other proposed solutions. A hand-held device records the holographic image, decodes its 2D barcode, and verifies its authenticity. A pseudorandom secret, the seed, known to the manufacturer allows it to make numerous copies of the same tag, but may be discarded to prevent it from being used by a counterfeiter. The holographic taggant is independent of any specific know-how, special materials, or trade secrets. It may be implemented by various different metasurface designs and materials, either metallic (plasmonic) or dielectric.

The tag of the present embodiments may thus serve as an authentication tag to prevent counterfeiting. The tag is compatible with the process, materials, and chain of distribution of pharmaceutical drugs, where the damage is not only measured in loss of revenue, but also in public health risks. A tag imprinted on a blister package, where a serial number is often imprinted (see FIG. 13a), can carry all the relevant information regarding the drug (drug/batch identifier, date of production/expiration, warnings etc.) and verify its authenticity by import/export authorities, distributors, pharmacies, clinics, and hospitals. The tagging process may be incorporated into the production line, and the interrogation may be made available along the supply chain. The microelectronics industry has also experienced an increase in counterfeit products. The tag of the present embodiments can be imprinted directly on microchips (FIG. 13b), PCBs and discrete elements, tagging the product for its entire lifetime. The small footprint of the tag makes it practical to implement on any of the product's surfaces. Other applications may include auto parts (FIG. 13c), where the QR code was first applied to identify original parts, consumer electronics (e.g. smartphones, TVs), luxury watches (FIG. 13d), jewelry, and art. A discrete security tag may be incorporated on the face or on the back.

An approach for realizing holographic optical authentication tags is now discussed in greater detail to demonstrate simple interrogation by a laser and camera scheme. The second layer of security discussed above utilizes the inherently pseudo-random nature of the image speckle pattern which is extremely difficult to replicate. As shown in FIG. 11, the projected image 110 may be binarized 112 by a low intensity threshold $\theta_{Low}$ to display an encoded message, in the form of a 2D barcode for example. A higher threshold $\theta_{High}$ reveals the speckle pattern 114, unique to the seed used, functioning as the secondary security layer, for further authentication. While a message carrying tag can be forged, the speckle pattern can only be accurately reproduced by the manufacturer correctly seeding a pseudo-random sequence. The concept may be realized as a plasmonic metasurface consisting of patch-dipole nano-antenna reflectarrays [Y. Yifat, M. Eitan, Z. Iluz, Y. Hanein, A. Boag and J. Scheuer, "Highly efficient and broadband wide-angle holography using patch-dipole nanoantenna reflectarrays," Nano Lett. 14(5), 2485-2490 (2014)], of which an example is shown in FIG. 9B. The image 110 produced by the resulting metahologram can be read by off-the-shelf QR code readers, and the authentic speckle pattern is clearly distinguishable from counterfeit tags.

Referring again to FIG. 7, in designing the tag, a message is chosen and encoded into a 2D barcode—box 70, which is used as the target image to be fed into the design algorithm in box 74. The object domain phasemap as shown in FIG. 9B is retrieved using the Gerchberg-Saxton algorithm taught in R. W. Gerchberg and W. O. Saxton, "A practical algorithm for the determination of phase from image and diffraction plane pictures," Optik (Stuttg) 35(2), 237-246 (1972), the contents of which are hereby incorporated herein by reference in their entirety. Implementing the algorithm in its original form, a random number generator is used to attain an initial guess. The random seed—box 72—may be considered the secret for the individual tag. Following a sufficient number of iterations (~2000) the algorithm stagnates at a certain error level, leaving the image uniquely speckled. Any change to the seed, or to the number of iterations, results in a completely different speckle pattern. Furthermore, by discarding the amplitude distribution in each iteration, this process becomes irreversible, making it a de facto one-way function.

The image then undergoes an intensity threshold process which leaves only the k brightest pixels lit. This combination of bright spots is unique to the tag and may be used to provide a fingerprint. FIGS. 12(a-c) compares a far field simulation with an experimentally observed image projected by an original tag. As found experimentally, the fingerprint is sufficiently robust against variations in the fabrication and illumination of the tag. This is in contrast to its high sensitivity to the seed and the secret starting conditions of the algorithm.

A counterfeiter in possession of the tag may acquire its design image, and its speckle pattern. He or she may then sample the far field image of the tag and attempt to design a counterfeit tag accordingly. FIGS. 12d and 12e show numerically that, given an ideal far field image, the counterfeit tag will inevitably display a fingerprint distinguishable from the original. Following the stagnation of the phase retrieval algorithm, on average only 67% of the fingerprint coordinates match.

The interrogation of the tag is illustrated schematically in FIGS. 10A and 10B. Interrogation may be carried out using a hand-held device 96 containing a laser source 100 and a camera 102. The system dimensions, i.e. the lateral distance between the laser source 100 and the camera 102, the side length of the array a, the distance to the tag d, and the spot size may be used to enforce further restrictions on the tag. For instance, a larger counterfeit tag, with side length b, enables higher resolution, but will form its far field image at a greater distance ($r>2b^2/\lambda>2a^2/\lambda$) than that formed by the original tag. Limiting the spot size and minimizing the distance to the tag prevents this approach from being used by a counterfeiter.

Thus FIG. 11 demonstrates a holographic authentication tag based on a secret random seed and a matching fingerprint. Copies of such tags are easy to manufacture using Nano-Imprint Lithography (NIL); however, a counterfeiter would not be able construct the same pattern without resorting to expensive interrogation methods. The authenticity verification scheme is very simple, resembling that used by commercial hand-held barcode readers. Finally, the fingerprint, being the output of a one-way function, can be distributed down the supply chain by broadcast without fear of the secret falling to the hands of a forger, and is completely sufficient for interrogation, but without the seed is insufficient for reproduction.

It is expected that during the life of a patent maturing from this application many relevant nanotechnology and hologram structures and techniques including modifications of the reflectarray will be developed and the scopes of the corresponding terms are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A nanotag comprising a dual layer metallic surface having an inner layer part and an outer layer part, said outer layer part of said dual layer metallic surface comprising nanostructures which, when illuminated with a predefined illumination, provide a predetermined unique optical pattern, wherein a first of said nanostructure dual layers is on a raised surface of resist and a second of said nanostructure dual layers is on an inclusion in said resist.

2. The nanotag of claim 1, comprising a layer of polydimethylsiloxane (PDMS) and/or a layer of sol-gel.

3. The nanotag of claim 1, wherein said resist shows a surface consistency indicating casting or molding.

4. A nanotag comprising a metallic outer surface layer, the metallic outer surface layer comprising a dual layer of nanostructures which, when illuminated with a predefined illumination, provide a predetermined unique optical pattern, wherein a first of said nanostructure dual layers is on a raised surface of resist and a second of said nanostructure dual layers is on an inclusion in said resist, wherein said resist shows a surface consistency indicating casting or molding.

5. A method of providing a secure nanotag for identification and authentication, the method comprising:
obtaining an image for identification;
providing a seed;
using the seed to seed a process for generating a phasemap that reproduces said image as a hologram;
terminating the process after a specified number of iterations;
using the phasemap to manufacture a nanotag surface to produce said hologram;
thresholding the hologram to provide a predetermined number of brightest pixels; and
providing a fingerprint for said nanotag that identifies a pattern produced by said brightest pixels, the fingerprint being for authentication.

6. The method of claim 5, wherein said image is a barcode comprising a message.

7. The method of claim 5, wherein said nanotag surface is contoured as a patch dipole nanoantenna reflectarray.

8. The method of claim 5, comprising affixing said nanotag to a product or packaging and separately distributing said fingerprint.

9. The method of claim 5, comprising manufacturing the nanotag surface to produce a hologram at a predetermined distance.

10. The method of claim 5, further comprising interrogating said nanotag by applying a laser beam to said nanotag and photographing said hologram.

11. The method of claim 10, wherein said image is a 2D barcode, the method comprising reading said barcode from said photograph.

12. The method of claim 11, wherein said fingerprint comprises a sequence of coordinates of said brightest pixels, the method comprising thresholding said photograph to find said predetermined number of brightest pixels and comparing said pixels to said coordinates.

13. A nanotag comprising:
   a surface comprising an implementation of a phase map to project an image as a hologram;
   the surface further comprising a speckle pattern of brightest pixels, the speckle pattern being unique to a seed number used to generate said phase map.

14. The nanotag of claim 13, wherein said surface comprises a patch dipole nanoantenna reflectarray.

\* \* \* \* \*